United States Patent [19]

McCabe

[11] Patent Number: 4,686,009
[45] Date of Patent: Aug. 11, 1987

[54] DISTILLATION SYSTEM

[75] Inventor: Derald L. McCabe, Dumas, Tex.

[73] Assignee: James W. Laney, Sunray, Tex.; a part interest

[21] Appl. No.: 792,548

[22] Filed: Oct. 29, 1985

[51] Int. Cl.⁴ .............................................. B01D 3/10
[52] U.S. Cl. .................................. 202/176; 202/180;
202/181; 202/196; 202/197; 202/200; 202/205;
202/235; 202/185 R; 203/1; 203/4; 203/11;
203/40; 203/91; 203/100; 203/DIG. 9;
159/DIG. 2; 159/DIG. 16; 55/36
[58] Field of Search ..................... 203/1, 4, 10, 11, 91,
203/98, 100, 40, DIG. 9, 47; 202/235, 177, 205,
202, 196, 181, 197, 176, 180, 159, 185.,1, 200;
55/36, 40, 185; 159/DIG. 2, 901, DIG. 16, 46

[56] References Cited

U.S. PATENT DOCUMENTS

| | | | |
|---|---|---|---|
| 2,904,509 | 9/1959 | Helmers | 202/197 |
| 3,200,050 | 8/1965 | Hogan et al. | 202/197 |
| 3,214,352 | 10/1965 | Wells | 203/11 |
| 3,245,883 | 4/1966 | Loebel | 202/197 |
| 3,298,929 | 1/1967 | Smith | 203/10 |
| 3,736,234 | 5/1973 | Miyamoto | 202/197 |
| 3,933,600 | 1/1976 | Dodge et al. | 203/10 |
| 4,045,293 | 8/1977 | Cooksley | 203/10 |
| 4,054,493 | 10/1977 | Roller | 203/11 |
| 4,217,176 | 8/1980 | Antony | 202/197 |
| 4,302,297 | 11/1981 | Humiston | 202/197 |
| 4,326,923 | 4/1982 | Martenson | 159/903 |
| 4,427,495 | 1/1984 | Masero | 202/197 |
| 4,444,623 | 4/1984 | Youngner | 202/197 |

FOREIGN PATENT DOCUMENTS 2415294 10/1975 U.S.S.R. .............................. 202/197

Primary Examiner—S. Leon Bashore
Assistant Examiner—V. Manoharan
Attorney, Agent, or Firm—Wendell Coffee; Montgomery W. Smith

[57] ABSTRACT

A vacuum distillation system uses a tower having an open bottom submerged within a tank of solution exposed to atmospheric pressure. The solution within the tower is elevated to barometric level by a high vacuum or low absolute pressure on the tower top. As solution flows through the open bottom and upward, the solution is heated and then cooled to cause degasification and precipitation, and then withdrawn from the tower top. The treated solution is flowed to a vaporization chamber that is subjected to a low absolute pressure. A heater maintains the solution at a selected chamber temperature above the boiling point of water at the selected chamber pressure. The chamber pressure and temperature may be selected as desired to yield the purest water distillate for almost any solution of water and impurities. Water vapor is pumped from the vaporization chamber by a vapor pump to a condenser, where condensation results from increased pressure and decreased temperature. The distillate water is removed from the condenser by a pump to a storage tank. The storage tank is also maintained under vacuum to keep the water gas free.

4 Claims, 1 Drawing Figure

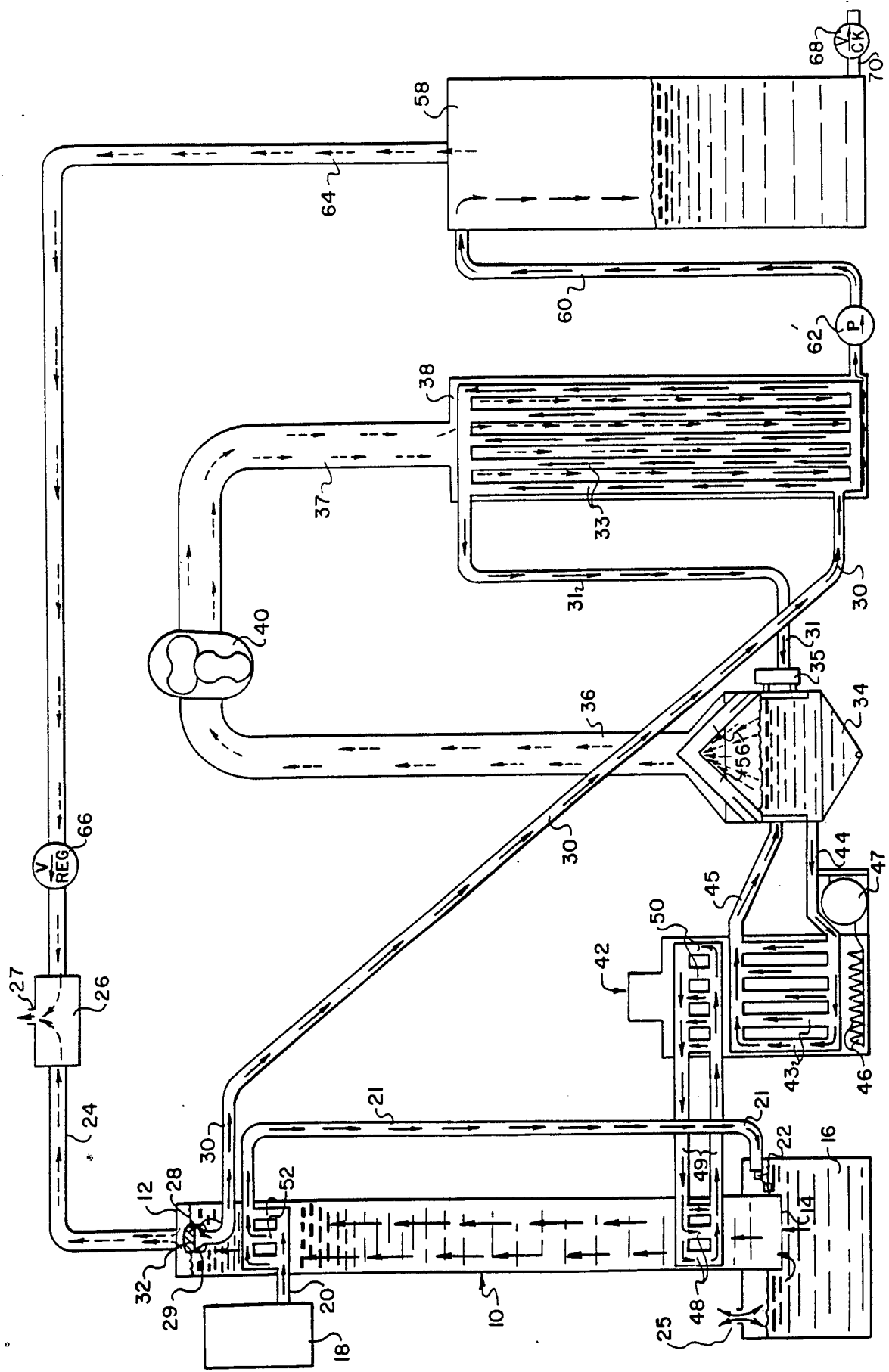

DISTILLATION SYSTEM

BACKGROUND OF THE INVENTION:

(1) Field of the Invention

This invention relates to vacuum water distillation. Applicant designates one with ordinary skill in the art to be a mechanical or chemical engineer or boiler maker.

(2) Description of the Prior Art

Many different types of distillation apparatus were used before my invention to purify water. Examples are: U.S. Pat. Nos. 3,420,745 to Schlueter; 3,860,494 to Hickman; 4,209,364 to Rothschild; 4,045,293 to Cooksley; 4,252,616 to Glazer; 4,396,463 to Josis et al; and 4,444,623 to Youngner. SCHLUETER used a vacuum distillation technique.

Prior art devices and processes tended to be complicated, with many moving parts. Gases were not satisfactorily removed from the distillate, and solids in the distilled solution often caked up the boiler.

SUMMARY OF THE INVENTION:

(1) New Function and Surprising Results

I have intended a very simple system for the vacuum distillation of contaminated water from almost any source. Although the specific purification apparatus and method disclosed are directed to purifying tap water, my invention is adaptable to the distillation of sewage effluent, steep water, and other solutions of contaminated water.

A distillation system according to my invention first removes gas, and precipitates out solids by subjecting the solution in a tower or column to a high vacuum as the solution is heated at the lower part of the tower and cooled near the top of the said tower.

Second, the solution is subjected to a high vacuum in a vaporization chamber. The solution temperature is at or above the boiling point of water at the chamber pressure. The selected pressures and temperatures in the vaporization chamber may be varied as desired to account for peculiarities in the solution, such as close boiling points of two compounds, or to accommodate restrictions on available heat or power to drive the vacuum pumps to reduce pressure in the system.

Vapor evaporated from the vaporization chamber is pumped to a condenser that cools the water vapor to below its boiling point. Distillate water is then pumped to a storage tank also placed under a vacuum to maintain the purified water in a pure, degassed condition.

My invention produces the surprising result of an extremely pure distillate from almost any solution with simple structure and method.

Thus it may be seen that the total function of my invention far exceeds the sum of the functions of the individual parts such as heat exchangers, vacuum pumps, and vessels.

(2) Objects of this Invention

An object of this invention is the distillation of water in a solution of water and impurities.

Further objects are to achieve the above with apparatus that is sturdy, compact, durable, simple, safe, efficient, versatile, ecologically compatible, energy conserving, and reliable, yet inexpensive and easy to manufacture, adjust, operate and maintain.

Other objects are to achieve the above with a method that is versatile, ecologically compatible, energy conserving, rapid, efficient, and inexpensive, and does not require skilled people to adjust, operate and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 1 is a schematic representation of a water distillation system according to my invention.

DESCRIPTION OF THE PREFERRED EMBODIMENT(S)

A variable vacuum purification system made according to my invention has a degasification and precipitation section, a vacuum distillation section, and a storage section. The sections combine to result in a combined function greater than the sum of the functions of the individual sections.

The degasification and precipitation section preferably includes degasification precipitation tower 10, having sides, a tower top 12 and a tower bottom 14. The tower 10 is preferably vertically oriented, with the tower bottom 14 disposed or submerged within supply tank 16.

Source tank 18 serves as a source of solution to be distilled. The solution broadly includes a water and impurities, which may include solutes or insoluble materials suspended in the water. For this embodiment, the solution preferably includes water as the solvent, and impurities, such as mineral salts and dust particles, commonly found in tap water. Distilled water with less than one half percent (0.5%) impurities has been obtained from a solution of tap water using a method and apparatus similar to that described below.

Supply lines 20 and 21 and upper exchanger tubes 52, taken together, form a supply line connecting the source of solution or source tank 18 and the supply tank 16. The upper exchanger tubes 52 will be discussed later.

Float valve 22 at the end of the supply line 21 is disposed within the supply tank 16, and opens and closes to regulate the flow of solution from the source tank 18 to the supply tank 16 responsive to the level of solution in the supply tank 16. The float valve 22 forms supply control means connected to the supply line for maintaining a desired supply level of the solution within the supply tank 16.

The tower bottom 14 is disposed below the desired supply level sufficiently so that regardless of any fluctuation in supply level permitted by operation of the float valve 22, the tower bottom 14 will remain submerged.

The tower 10 is fluidly connected by tower duct 24 to tower vacuum means for maintaining a desired tower gas pressure on a surface of the solution within the tower, in the form of vacuum pump 26. The vacuum pump 26 reduces the gas pressure at the tower top 12 to as near an absolute pressure of zero as possible, and in any event, exerts an absolute pressure less than about two inches of mercury (<2 in Hg) on the solution within the tank.

Applicant has tried to refer to gas pressures herein in absolute terms. The absolute pressure is atmospheric pressure minus vacuum. Standard absolute pressure is about 29.92 inches of mercury at 32° F. (32 in Hg 32° F.), or 14.696 pounds per square inch (psi). Thus at standard conditions, the absolute pressure equals atmospheric pressure, and vacuum equals zero. For example, 2 in Hg absolute pressure in a vessel or system as used herein, with an atmospheric pressure of 29 in Hg is equivalent to "pulling 27 in Hg vacuum" on that vessel or system.

The surface of the solution within the supply tank is exposed or fluidly connected to atmospheric pressure at vent 25. Thus, the differential pressure between the atmospheric pressure and the tower gas pressure will result in forcing the water upward within the tower to a desired tower level of the solution surface within the tower 10 proximate the top 12. Simple calculation will show the water level in the tower 10 will be over 20 feet above the water level in the supply tank 16.

A solution withdrawal device in the form of float 28 and spacer 29 is disposed proximate the tower top 12. The float 28 is formed of a material that is buoyant in the solution. The spacer 29 is shaped to hold and extend, maintain, or submerge, chamber line end 32 of chamber line 30 just below the surface of the solution proximate the tower top. Thus, the float 28 and spacer 29 keep the chamber line end 32 submerged just below the surface of the solution within the tower 10 despite any variation in the level of the solution due to changes in the either the tower gas pressure or atmospheric pressure.

The distillation section includes vaporization chamber 34, a vapor duct in the form of vapor ducts 26 and 37 fluidly connecting the vaporization chamber 34 to the condenser vessel 38, vapor pump 40 fluidly connected in the vapor ducts between the ducts 36 and 37, and heater 42.

Level control 35 regulates the flow of solution from the tower 10 through the chamber line 30 and chamber line 31 to the vaporization chamber 34, opening a valve in the control 35 (not shown) when the level in the chamber 34 falls below a desired chamber level and closing the valve when the level reaches the desired chamber level. The level control 35 forms chamber level control means connected to the chamber line 31 for maintaining a desired chamber level of the solution within the chamber.

The vapor pump 40 forms means for transferring water vapor, from the vaporization chamber 34 to the condenser vessel 38 through the vapor ducts 36 and 37. The vapor pump also provides means for maintaining a selected chamber gas pressure within the chamber 34 that is related to a selected chamber temperature of solution within the vaporization chamber 34 such that the selected chamber temperature is above the boiling point of the, water at the selected chamber pressure.

As those familiar with steam tables, and the pressure temperature relationship of the boiling points of water and other common compounds will know, as the gas pressure on a liquid solution decreases so does the boiling point of compounds within the solution, although not in direct relation. Thus, if the gas pressure on the solution within the chamber 34 is reduced to less than eight inches of mercury (8 in Hg), the temperature at which the water in the solution will boil will also be reduced to less than about 150° F. Correspondingly, a reduction to less than two inches of mercury (2 in Hg) will lower the boiling point of water within the solution to 100° F. or less.

Thus, the selected chamber gas pressure exerted on the solution within the vaporization chamber 34, is related to the selected chamber temperature required to produce boiling or vaporization of the water. Hence, my variable vacuum distillation facilitates distillation under varying conditions using different sources of water. If organics in the solution have boiling points close to that of water at one pressure, the chamber may be selected for better separation. Alternatively, the system can accommodate various heat sources and temperatures by varying the vacuum.

Although the solution within the chamber 34 could be heated directly, such as with common boilers, I prefer to utilize a heat exchanger for the heater 42, as shown in the drawing. The heater 42 preferably includes heater tubes 43 fluidly connected to the vaporization chamber 34, below the desired chamber level, for recirculation of the solution through the heater tubes 43 by recirculation lines 44 and 45. As can be seen, a natural convection flow will result within the chamber for the the plumbing connections shown in the drawings, as cooler solution is withdrawn into recirculation line 44, heated in the heater tubes 43, and flowed back through the recirculation line 45. The water could also be pumped from the chamber to the heater so as to cause an agitation of the chamber and heater contents, resulting in more uniform temperature throughout the water solution as desired.

The heater 42 shown in the drawing uses only one possible heat source, such as natural gas, supplied to forced air burners 46. A thermostat (not shown) on the heater is set to maintain the water solution at the selected chamber temperature by regulating the flow of natural gas to the burners 46. Another control, instead of regulating the burners, would be to regulate the flow of solution between the chamber 34 and the heater 42 with a suitable valve arrangement controlled by the thermostat, such as when using a constant heat source such as solar heated liquid. Thus, the heater 42 provides heater means associated with the vaporization chamber 34 for maintaining the solution within the chamber at a selected chamber temperature. The selected chamber temperature is substantially below the standard or atmospheric point of water.

I prefer to place baffles within the vaporization chamber 34 above the desired chamber level to trap water droplets that may be withdrawn upward with water vapor. Such water droplets might tend to have contaminants still dissolved therein.

The cooled water solution, withdrawn from the tower top 12 through the chamber line end 32, is preferably flowed through the condenser exchanger tubes 33 to absorb heat from the waer vapor pumped into the condenser vessel 38. The condenser exchanger tubes 33 are fluidly connected in the chamber line between the lines 30 and 31.

As schematically shown in the drawing, I prefer to use a "Roots" or lobe-type gas pump for the vapor pump 40, which is a positive displacement gas pump that will cause a pressure higher than the selected chamber gas pressure to be exerted on the condenser vessel downstream from the vapor pump 40. Thus, increased gas pressure on the water vapor and a decrease in temperature of the vapor result in condensation in the condenser vessel 38.

The gas pressure within the condenser vessel is preferably greater than the chamber gas pressure but still substantially below atmospheric pressure.

The condenser vessel 38 is fluidly connected to storage tank 58 by storage line 60. The storage line 60 is preferably connected to the condenser vessel 38 proximate a bottom of the condenser vessel 38. Storage pump 52 withdraws any water distillate from the condenser vessel 38 to the storage tank 58. The storage line 60 is preferably connected at the top of the storage tank.

The storage tank 58 is fluidly connected at the top thereof to the vacuum pump 26 by storage duct 64. Storage vacuum means in the form of vacuum control valve 66 in the storage duct 65 maintains the storage gas pressure exerted on the storage tank 58 not more than ten inches of mercury (10 in Hg) below atmospheric pressure.

In order to insure that the water in the tank remains pure, I also prefer to have check valve 68 in dispensing line 70 connected to the storage tank for dispensing the water distillate as needed. The check valve 68 will prevent contaminants from entering the storage tank 58 from the dispensing line 70.

I prefer to heat the solution within the tower 10 in the lower part of the tower, proximate the tower bottom 14. Exchanger tubes 48 are fluidly connected to heater tubes 50 of the heater 42 by heater lines 49. A separate thermostat (not shown) preferably regulates the recirculation of solution between the heater 42 and the chamber 47. The temperature of the solution at the exchange tubes 48 may exceed the boiling point of water at the tower pressure.

To prevent boiling of the solution and the undesirable withdrawal and loss of water vapor from the solution through the tower duct 24 and vacuum pump 26, the solution is cooled below the boiling point of water at the tower gas pressure by the upper exchanger tubes 52 disposed within the tower 10 near the top 12. The upper exchanger tubes are fluidly connected in the supply line between lines 20 and 21.

The heat exchangers described in the tower and elsewhere are preferably shell and tube counter flow type heat exchangers with the tower or vessel walls forming the shell within which one fluid flows about the tubes for heat exchange with separate fluid flowed within the tubes.

Thus, having described the apparatus for this preferred embodiment, the operation may be seen to occur as follows. Solution, accumulated and stored in the source tank 18 is preferably at a cool temperature. The solution flows from the source tank 18 through the supply line 20 to the upper exchanger tubes 52. The cool solution in the tubes 42 absorbs heat from the heated solution in the tower, and then flows through the supply line 21 to the float valve 22. As water is withdrawn from the tower top 12, the supply tank 16 level will fall, opening the float valve 22, and flowing solution from the supply line 21 into the supply tank 16.

As the solution flows through the open tower bottom 14 upward into the tower 10, it flows past, and absorbs, heat from, the lower exchanger tubes 48 above but proximate the tower bottom 14. The heated solution travels upward through the tower 10 to the upper exchanger tubes 52. The solution within the tower 10 is cooled as passes between the upper exchanger tubes 52 to a desired tower top temperature well below the boiling point of water at the tower gas pressure exerted on the tower top 12 and created by the vacuum pump 26. The changes of temperature within the tower 10, and the very low tower gas pressure combine to cause degasification and precipitation of the solution. The gases exit through vacuum pump outlet 27. The thusly treated solution will not deposit substantial amounts of scale in the vaporization chamber, and will not contaminate the distillate with gaseous impurities.

The cool, treated solution is then withdrawn through the spacer 29 below the float 28 into the end 32 of the chamber line 30. The fluid connection of the chamber line 30 at the top of the tower, which will in most cases exceed 30 feet in height, creates a head for natural pressure flow through the condenser exchanger tubes 33. The cool, treated solution absorbs heat from the water vapor pumped into the condenser vessel 38 from the vaporization chamber 34 as it flows through the condenser exchanger tubes 33.

The treated and heated solution then flows from the condenser exchanger tubes 33 through the chamber line 31 into the vaporization chamber 34 through the chamber level control 35. The chamber level control 35 will maintain the surface of the solution within the chamber 34 at the desired level below the baffles 56. The solution is recirculated from the chamber through the heater 42, and maintained at the selected chamber temperature by this heater means.

The chamber pressure and chamber temperature are selected so that the selected chamber temperature is above or at least the boiling point of water at the selected chamber pressure. The chamber pressure and temperature conditions are also selected to obtain as pure a distillate as feasible from the solution using as little heat and gas pump energy as possible.

As the vapor pump 40 maintains the selected chamber gas pressure in the chamber, the water within the solution boils, since the selected chamber temperature exceeds the boiling point of water at the selected chamber pressure. The flow of water vapor will tend to carry water droplets upward with the vapor pumped from the chamber through the vapor duct 36, gas pump 40, and vapor duct 37 to the condenser vessel 38. The water droplets will collect on the baffles 56 and trickle down to the solution in the chamber 34, instead of being carried to the condenser 38.

Once past the gas pump and into the condenser vessel 38, the water vapor is subjected to a greater condenser gas pressure, and cooled as heat is exchanged with the cool solution flowing from the tower 10 through the condenser exchanger tubes 33. Thus the water vapor temperature will be reduced to the boiling point of water at the condenser gas pressure. As the water collects on the condenser exchanger tubes 33, the temperature of the water will be reduced below its boiling point as heat is further exchanged. The condensate will collect at the bottom of the condenser vessel 38.

The pure distillate water will then be withdrawn from the condenser vessel 38 by the pump 62, flowed to the top of the storage tank 58, and dumped into the storage tank 58. The water stored within the storage tank 58 is maintained gas free by the exertion of a vacuum thereon that is substantially below atmospheric pressure but that is also not more than ten inches of mercury below atmospheric pressure. At the temperature of the water distillate within the storage tank, the gas pressure is such that the distillate will be maintained substantially gas free, and an acceptable, insubstantial amount of water vapor will be withdrawn through the storage vacuum line 64.

Additional storage tanks (not shown) also connected to the vacuum line 64 could be placed on line in the event the storage tank 58 shown is filled. Even after filling however, the storage tank would still be connected to the vacuum pump 26 through the vacuum valve 66 to maintain less than atmospheric gas pressure on the distillate within the storage tank.

The dashed arrows in the drawing represent gas or vapor flow and the solid arrows represent liquid flow.

The embodiment shown and described above is only exemplary. I do not claim to have invented all the parts, elements, or steps described. Various modifications can be made in the construction, material, arrangement, and operation, and still be within the scope of my invention.

The limits of the invention and the bounds of the patent protection are measured by and defined in the following claims. The restrictive description and drawing of the specific example above do not point out what an infringement of this patent would be, but are to enable the reader to make and use the invention.

As an aid to correlatiang the terms of the claims to the exemplary drawing the following catalog of elements is provided:

Catalog of Elements

10: degassing tower
12: tower top
14: tower bottom
16: supply tank
18: source tank
20: supply line
21: supply line
22: float valve
24: tower duct
25: vent line
26: vacuum pump
27: vacuum pump outlet
28: float
29: spacer
30: chamber line
31: chamber line
32: chamber line end
33: condenser exchanger tubes
34: vaporization chamber
35: chamber level control
36: vapor duct
37: vapor duct
38: condenser vessel
40: gas pump
42: heater
43: heater tubes
44: recirculation line
45: recirculation line
46: forced air burners
48: lower exchanger tubes
49: heater lines
50: heater tubes
52: upper exchanger tubes
56: baffles
58: storage tank
60: storage line
62: storage pump
64: storage duct
66: vacuum valve
68: check valve
70: dispensing line

I claim as my invention:

1. Apparatus for water distillation comprising:
   a. means defining a source of solution that includes water,
   b. a supply tank,
   c. a supply line connecting the source of solution to the supply tank,
   d. a supply control means connected to the supply line for maintaining a supply level of the solution within the supply tank,
   e. a vent means connected to the supply tank,
   f. a degasification tower having sides, a top, and a bottom, said tower extending from above the supply tank to below the supply level within the supply tank,
   g. a vacuum pump means connected to the degasification tower proximate the tower top for maintaining a tower gas pressure substantially below atmospheric pressure,
   h. a lower heat exchanger in the tower, proximate the bottom of the tower, for adding heat to solution within the tower,
   i. an upper heat exchanger within the tower proximate the top of the tower for removing sufficient heat from the solution so that the temperature of the solution above the upper heat exchanger is below the boiling point of water at the tower gas pressure,
   j. a vaporization chamber,
   k. a chamber line connecting the vaporization chamber to the degasification tower,
   l. a level control means connected to the chamber line for maintaining a chamber level of the solution within the said chamber,
   m. a heater means connected to the vaporization chamber for maintaining the solution within the vaporization chamber at a chamber temperature that is substantially below the atmospheric boiling point of water,
   n. a condenser vessel,
   o. a vapor duct connecting the vaporization chamber to the condenser vessel,
   p. a vapor pump connected to the vapor duct for transferring water vapor from the vaporization chamber to the condenser through the vapor duct: and for maintaining a chamber gas pressure in the vaporization chamber that is substantially below atmospheric pressure,
   q. a cooling means connected to the condenser vessel for cooling the water vapor;
   r. a closed storage tank,
   s. a storage line connecting the storage tank with the condenser vessel at a bottom of the condenser vessel,
   t. a vacuum valve connected to the storage tank for maintaining a storage gas pressure within the storage tank that is less than atmospheric pressure and greater than the vaporization chamber gas pressure and the degasification tower gas pressure.

2. The apparatus as defined in claim 1 further comprising:
   a plurality of baffles disposed within the vaporization chamber for trapping water droplets.

3. The apparatus as defined in claim 1 further comprising:
   a float means at the top of the tower,
   and means for spacing an end of the chamber line below the surfaces of the solution.

4. The apparatus as defined in claim 1:
   wherein said heater means includes a heat exchanger having
   a heater shell,
   a heat source connected to the shell for heating the solution within, and
   heater exchanger tubes disposed within the heater shell;
   and wherein the condenser vessel includes a condenser exchanger tubes disposed within said condenser.

* * * * *